United States Patent
Nagao et al.

(10) Patent No.: US 8,769,166 B2
(45) Date of Patent: Jul. 1, 2014

(54) DATA TRANSFER APPARATUS AND DATA TRANSFER METHOD

(75) Inventors: Chuma Nagao, Kunitachi (JP); Daisuke Shiraishi, Tokyo (JP); Takeshi Hiraoka, Tokyo (JP); Akiyoshi Momoi, Bangalore (IN)

(73) Assignee: Canon Kabushiki Kaisha, Tokyo (JP)

( * ) Notice: Subject to any disclaimer, the term of this patent is extended or adjusted under 35 U.S.C. 154(b) by 62 days.

(21) Appl. No.: 13/465,712

(22) Filed: May 7, 2012

(65) Prior Publication Data

US 2012/0290746 A1    Nov. 15, 2012

(30) Foreign Application Priority Data

May 11, 2011    (JP) .................. 2011-106403

(51) Int. Cl.
*G06F 13/00*    (2006.01)
(52) U.S. Cl.
USPC .......................................................... 710/33
(58) Field of Classification Search
USPC .......................................................... 710/33
See application file for complete search history.

(56) References Cited

U.S. PATENT DOCUMENTS

2002/0144085 A1    10/2002    Hiratsuka et al.
2010/0191911 A1*    7/2010    Heddes et al. ................ 711/118

FOREIGN PATENT DOCUMENTS

JP    11-102341 A    4/1999
WO    94/08296 A1    4/1994

OTHER PUBLICATIONS

"PCI Express Base Specification Revision 1.1" PCI-SIG, Mar. 2005, pp. 43-78.

* cited by examiner

*Primary Examiner* — Chun-Kuan Lee
(74) *Attorney, Agent, or Firm* — Canon U.S.A., Inc., IP Division

(57) ABSTRACT

A packet accompanying data valid information is transferred at high efficiency within an integrated circuit or between integrated circuits. A character indicating data enable information is provided and an identifier indicating a data enable character is assigned onto the packet. When the data enable information is valid in series, the data enable characters are eliminated from the packet to be transferred.

14 Claims, 7 Drawing Sheets

FIG. 5

| Wdata[31:0] | Wstrb[3:0] |
|---|---|
| Wdata0 | 0111 |
| Wdata1 | 1111 |
| Wdata2 | 1111 |
| Wdata3 | 1101 |
| Wdata4 | 1111 |
| Wdata5 | 1111 |

Wstrb0 } (Wdata0, Wdata1)
Wstrb1 } (Wdata2, Wdata3)

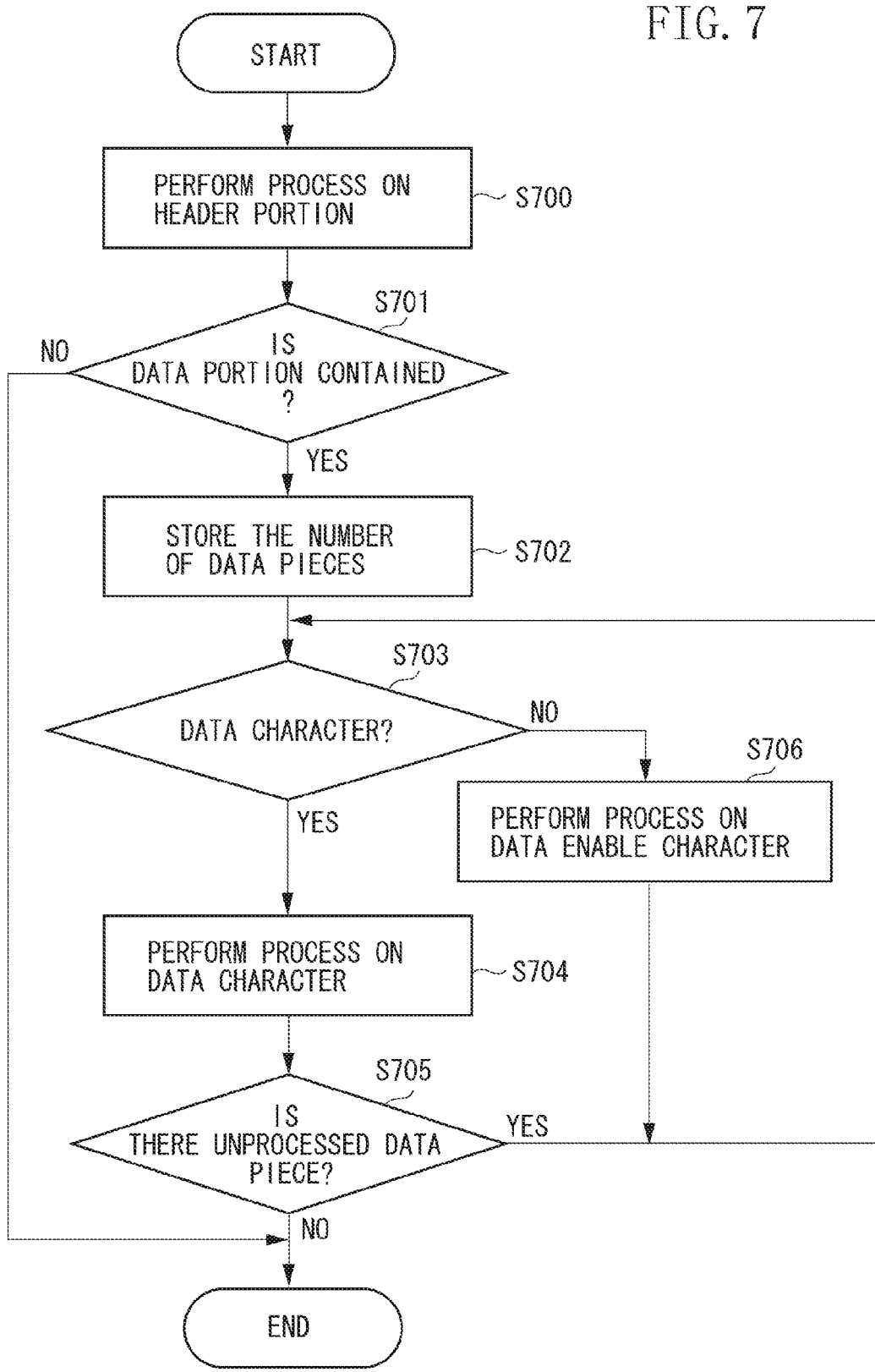

DATA TRANSFER APPARATUS AND DATA TRANSFER METHOD

BACKGROUND OF THE INVENTION

1. Field of the Invention

The present invention relates to a data transfer apparatus and a data transfer method using a packet.

2. Description of the Related Art

Technologies for data transfer using a packet have been adopted in various fields. Transmission Control Protocol/Internet Protocol (TCP/IP) is a technology to transfer data on the Internet on a packet basis. Peripheral Component Interconnect-Express (PCI-Express) is a technology to transfer data between integrated circuits on a packet basis. Further, Network On Chip (NoC) is another technology to transfer data within an integrated circuit on a packet basis.

Data transfer on a packet basis has an advantage in that various pieces of information such as address and data essential for transfer can be transferred using a small number of signal lines. For example, in PCI-Express, only two pairs of differential lines are necessary for data transfer. Data transfer on a packet basis has another advantage in that transfer rate can be easily raised. The data transfer system on a packet basis, more cycles required for transfer compared to non-packet basis data transfer systems. Thus, technologies have been discussed to increase efficiency in data transfer on a packet basis in which a packet configuration is improved to reduce an amount of information to transfer so that the number of cycles required for transfer is decreased.

As a measure to decrease information to transfer, PCI-Express described in "PCI Express Base Specification Revision 1.1" PCI-SIG, March 2005 describes a protocol in which the data except the head 4-byte data and the tail 4-byte data in a data payload at memory request is handled as valid, and the portion in a packet configuration except the byte enable identification information (Last DW BE 1st DW BE) corresponding to the head 4-byte data and the tail 4-byte data of the data payload is omitted, so that the information on the packet is decreased.

Japanese Patent Application Laid-Open No. 11-102341 discusses a data transfer system in which only valid data is transferred based on byte enables attached, in units of bytes, to data to transfer onto a serial bus, so that transfer of invalid data is suppressed and efficiency in data transfer is enhanced.

Meanwhile, a parallel bus in non-packet basis is mainly used for data transfer within an integrated circuit. A protocol in a parallel bus within an integrated circuit often includes byte enables (e.g., 8 bits) for every unit of data (e.g., 64 bits that is equal to a bus width) to indicate which data byte is valid in one unit of data transfer (e.g., 64 byte=64-bit bus width×8 burst transfer). Similarly, protocols on data transfer for Dynamic Random Access Memory (DRAM) as a mainstream storage apparatus also support use of the byte enables. In such protocols, data transfer from a master to a slave (e.g., DRAM) in a whole system including within an integrated circuit and between integrated circuits is achieved by mutual use of transfer on packet basis or transfer in non-packet basis with use of byte enables.

With respect to a transfer path from a parallel bus within an integrated circuit to PCI-Express between integrated circuits, a case where data of one transfer unit from a parallel bus contains invalid data other than the head 4 byte and the tail 4 byte thereof is described in detail. A protocol in PCI-Express handles the data except tail and head portions in a data payload (i.e., one transfer unit) as valid data to transfer, and thereby at data transfer to PCI-Express, the transfer is divided at a position in invalid data at least, and headers need to be added to the divided transfers respectively. For example, when data is transferred to PCI-Express, the data being transferred from a parallel bus of 64-bit data bus width as one unit of 64 byte (64 bit bus width×8 burst transfer) containing invalid data of 1 byte at every 8-byte data, the data is divided into 8-byte transfers for example, and the transfers each need to have a header. This division and increased headers occupy the transfer bandwidth, and impairs transfer efficiency.

On the contrary, in the case with Japanese Patent Application Laid-Open No. 11-102341, a byte enable is attached to data, in units of bytes, to be transferred onto a serial bus, and thereby when the data contains valid data at high rate, the high amount of byte enable data itself impairs the transfer efficiency.

SUMMARY OF THE INVENTION

The present invention is directed to increasing the efficiency of data transfer.

According to an aspect of the present invention, a data transfer apparatus is provided, the apparatus including: a reception unit configured to receive a packet including data and valid information indicating whether the data is valid in units of bytes; and a transmission unit configured to transmit apiece of the valid information corresponding to a data portion of a first number of bits in the data received by the reception unit, an identifier indicating presence of the valid information piece, and the data portion of the first number of bits, in association with one another, wherein, the transmission unit is configured, when the data portion of the first number of bits in the data is valid, to skip transmission of the piece of the valid information corresponding to the data portion of the first number of bits.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates an example of transfer data.

FIG. 7 illustrates a process flow performed by a character determination unit.

DESCRIPTION OF THE EMBODIMENTS

Various exemplary embodiments, features, and aspects of the invention will be described in detail below with reference to the drawings.

Figure 1:
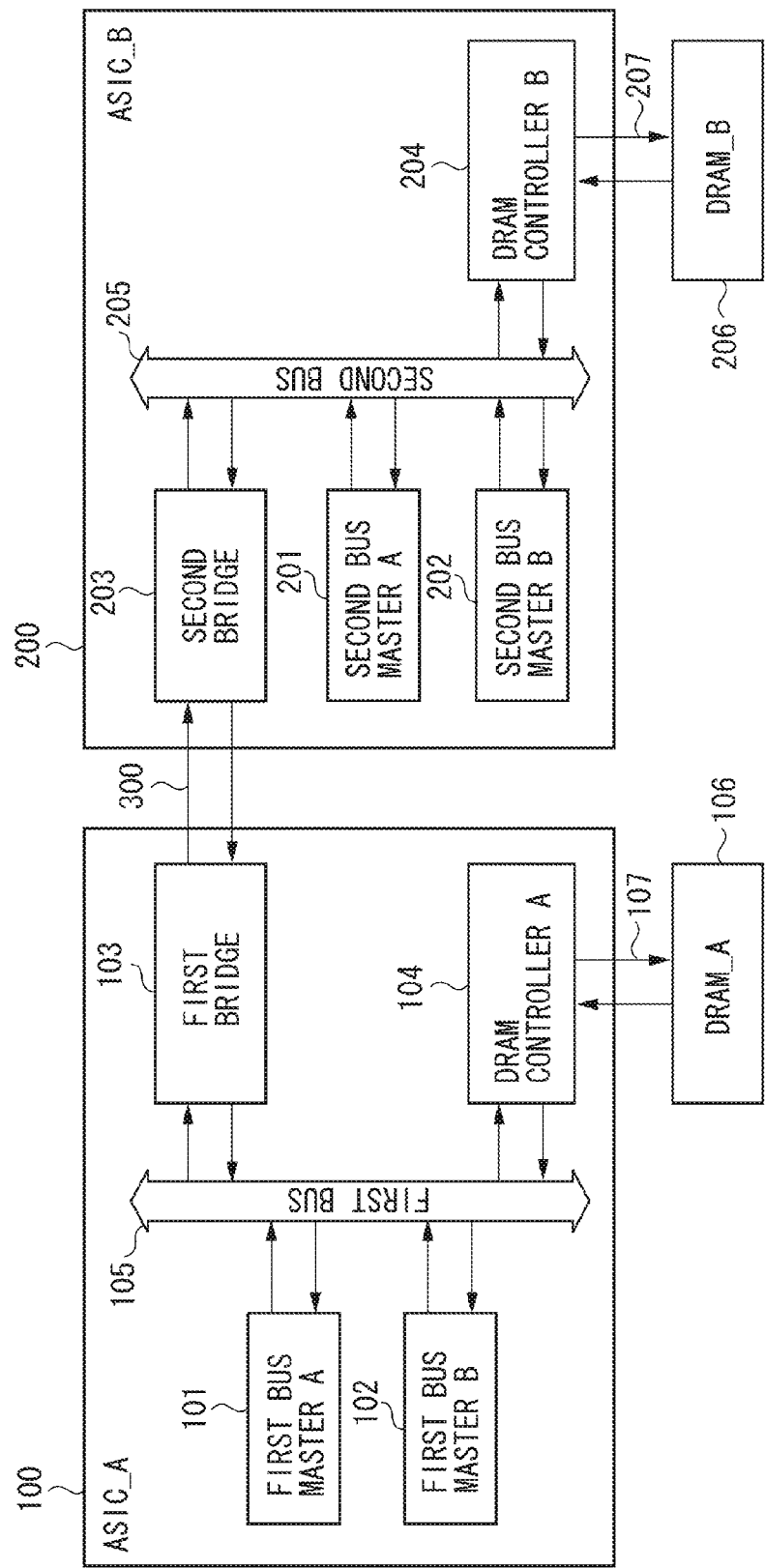
FIG. 1 schematically illustrates a structure of a system.

FIG. 1 illustrates a system according to an exemplary embodiment of the present invention. A system configuration in which an ASIC_A 100 and an ASIC_B 200 mutually connected through a serial bus 300 is illustrated. ASIC stands for Application Specific Integrated Circuit.

On the serial bus 300, data is transferred in a packet. The ASIC_A 100 includes a first bus master A 101, a first bus master B 102, a first bridge 103 as a bridge between the first bus and the serial bus, and a DRAM controller A 104. These modules are mutually connected through a first bus 105. The first bus 105 is a parallel bus to which addresses and data are connected using lines exclusive to them respectively. The first bus master A 101 and the first bus master B 102 transfer data via the first bus 105 to and from the first bridge 103 and the DRAM controller A 104. The DRAM controller A 104 and the DRAM_A 106 transfers data to each other via a DRAM I/F A 107. The first bridge 103 transforms data received through the first bus 105 into that for the serial bus 300 to transfer the data to a second bridge 203 that is the connection destination in the ASIC_B 200.

Meanwhile, the ASIC_B 200 includes a second bus master A 201, a second bus master B 202, the second bridge 203, and a DRAM controller B 204. Each module is mutually connected through a second bus 205. The second bus 205 is a parallel bus to which addresses and data are connected using lines exclusive to them respectively. The second bridge 203 transforms data received through the serial bus 300 into that for the second bus 205 to transfer the data to the DRAM controller B 204 via the second bus 205. The second bus master A 201 and the second bus master B 202 transfer data through the second bus 205 to and from the DRAM controller B 204. The DRAM controller B 204 and the DRAM_B 206 transfer data through the DRAM I/F B 207 to each other. In the present exemplary embodiment, both of the first and second buses have a data bus width of 64 bits.

Figure 2:
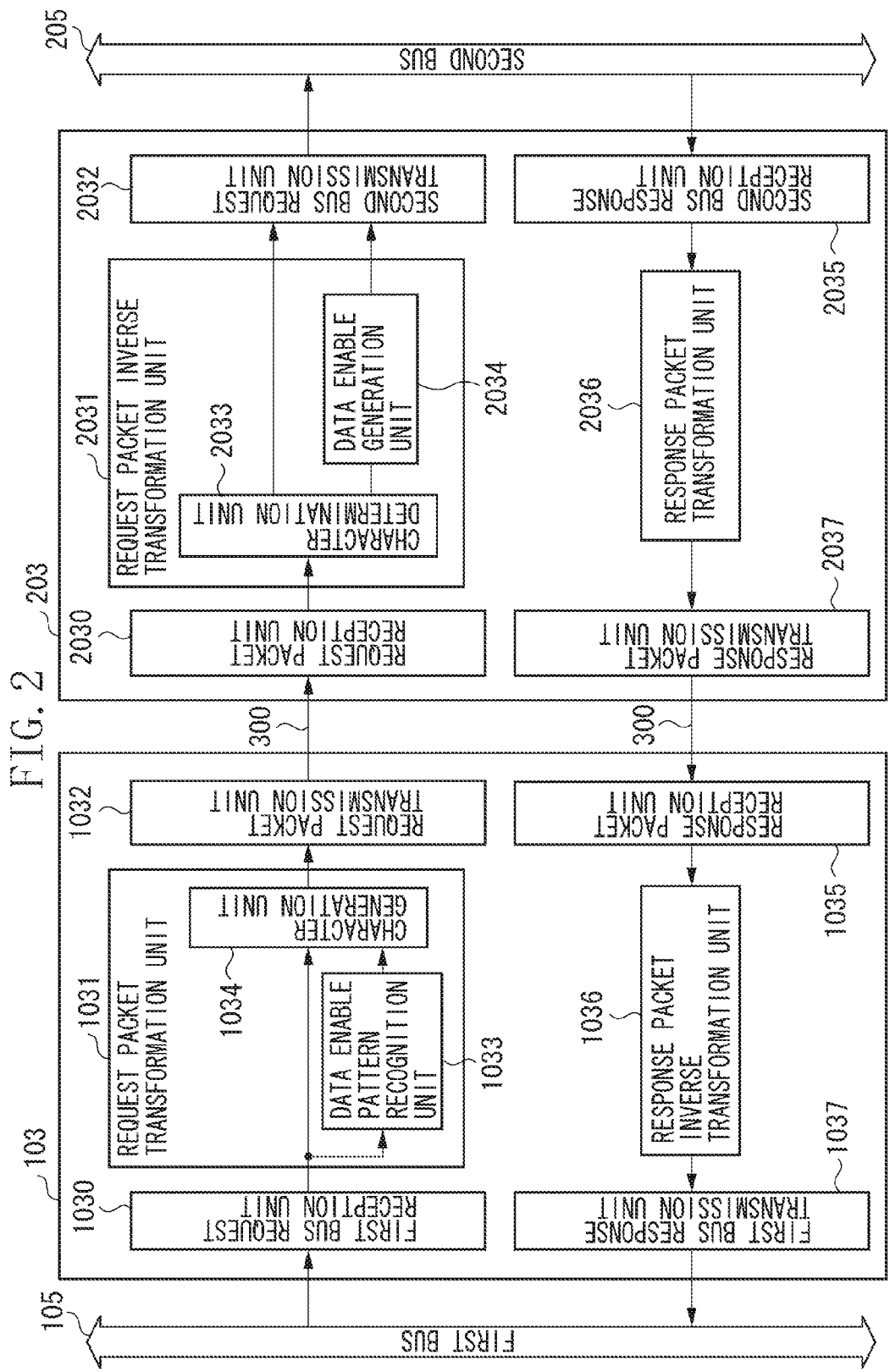
FIG. 2 illustrates structures of first and second bridges.

FIG. 2 illustrates structures of the first bridge 103 and second bridge 203 to achieve a transfer system of the present exemplary embodiment. Processes at the bridges will be described.

First, a request transmission process will be described. A first bus request reception unit 1030 receives requests from the first bus master A 101 and the first bus master B 102 via the first bus 105. The bus masters A 101 and bus master B 102 each outputs a request containing an address of a transfer destination (Address), a flag indicating whether transfer is Write transfer or Read transfer, the size of data transferred, write data (Wdata), a write strobe (Wstrb), and attribution information (ReqAtrb) about the transfer.

The first bus request reception unit 1030 extracts, from the request according to a signal that controls timing of the request, the address, the flag indicating Write transfer or Read transfer, and write data and the write strobe when the flag indicates Write transfer, and transfers the information pieces to a request packet transformation unit 1031.

The request packet transformation unit 1031 transforms the received request to a packet. The request packet transformation unit 1031 includes a data enable pattern recognition unit 1033 and a character generation unit 1034.

The data enable pattern recognition unit 1033 receives the write strobe (Wstrb: valid information) indicating presence or absence of valid data for every 1 byte of the transferred data, in the request from the first bus request reception unit 1030. The data enable pattern recognition unit 1033 then determines whether the write strobe (Wstrb) is true for every clump of serial data (i.e., for every first number of bits). In the present exemplary embodiment, it is determined whether the write strobe (Wstrb) is true in succession for every data clump of 64-bit (i.e., units of 8 bytes) signal. The character generation unit 1034 receives the request from the first bus request reception unit 1030 and the result of determination made by the data enable pattern recognition unit 1033, and generates characters individually which will be described later.

Figure 3A:
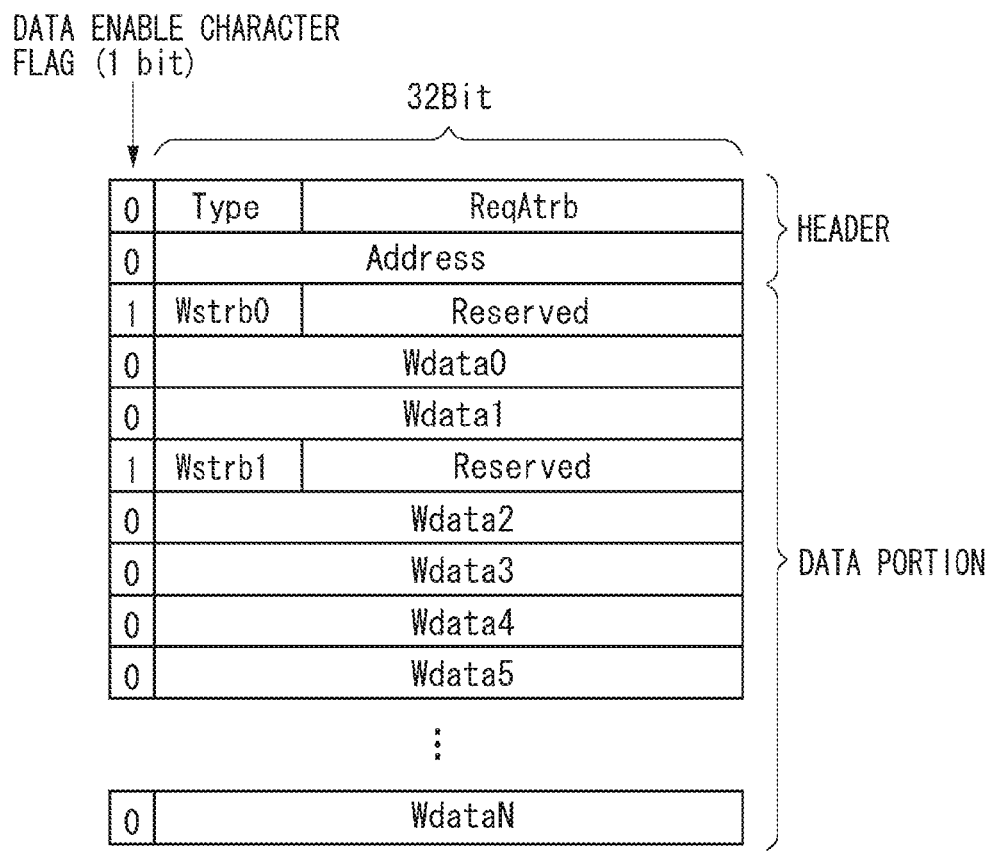
FIGS. 3A and 3B each illustrate a packet format.
Figure 3B:
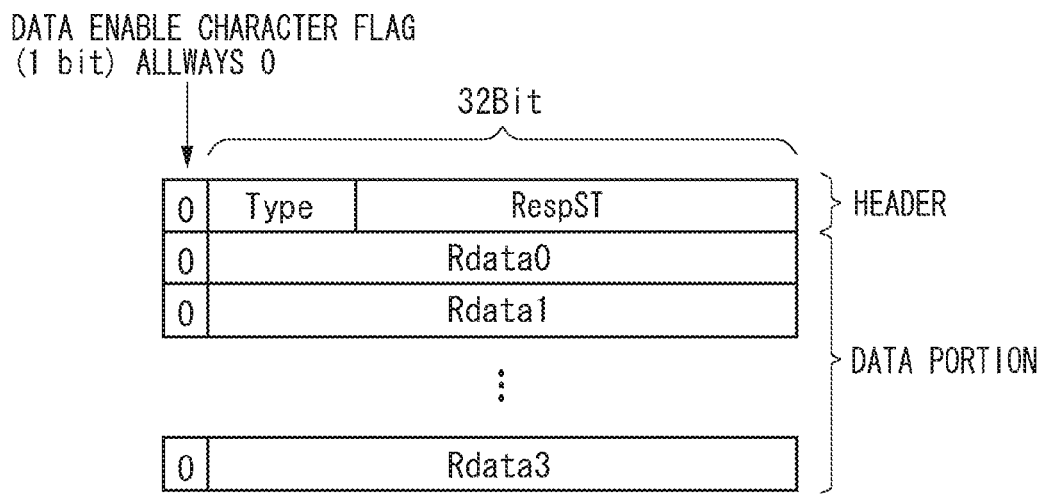

FIGS. 3A and 3B each illustrate an example of a packet having a plurality of characters generated by the character generation unit 1034. The packets each include a header and a data portion. Each character for the header and the data portion includes 33 bits in the packet of the present exemplary embodiment, but may include another number of bits. The character, however, can have a predetermined length to enhance convenience of data transfer. Both of the header and the data portion are each divided into clumps of 32 bits (a second number of bits) signal, and assigned to every clump a 1-bit flag as an identifier indicating whether the clump is a data enable character. The clumps with the flags constitute a packet having 33-bit characters. A data enable character has a byte enable (i.e., partially valid information in the present exemplary embodiment) for 64-bit data (i.e., data portion of a first number of bits), and thereby a flag indicating the data enable character is equivalent to indicating presence or absence of the partially valid information. The byte enable indicates whether the data is valid in units of bytes.

FIG. 3A illustrates an example of a packet of a write request. The packet includes a header containing a character with an identifier for packet type (Type) and transfer attribution information (ReqAtrb: Request Attribution), and a second character with an address of a transfer destination (Address). The packet also includes a data portion containing characters with write data (Wdata), and data enable characters (i.e., characters for write strobes) that are generated only at Write transfer. The head bit of each character of the packet is a data enable character flag as an identifier indicating whether the character is a data enable character or a data character. In the example in FIG. 3A, the third and sixth characters have a flag "1" individually, indicating they are data enable characters, whereas the other characters have a flag "0" individually as data characters. Unless every byte of the transfer data is valid, the data portion includes at least one pair of data enable character and a data character.

Figure 4:
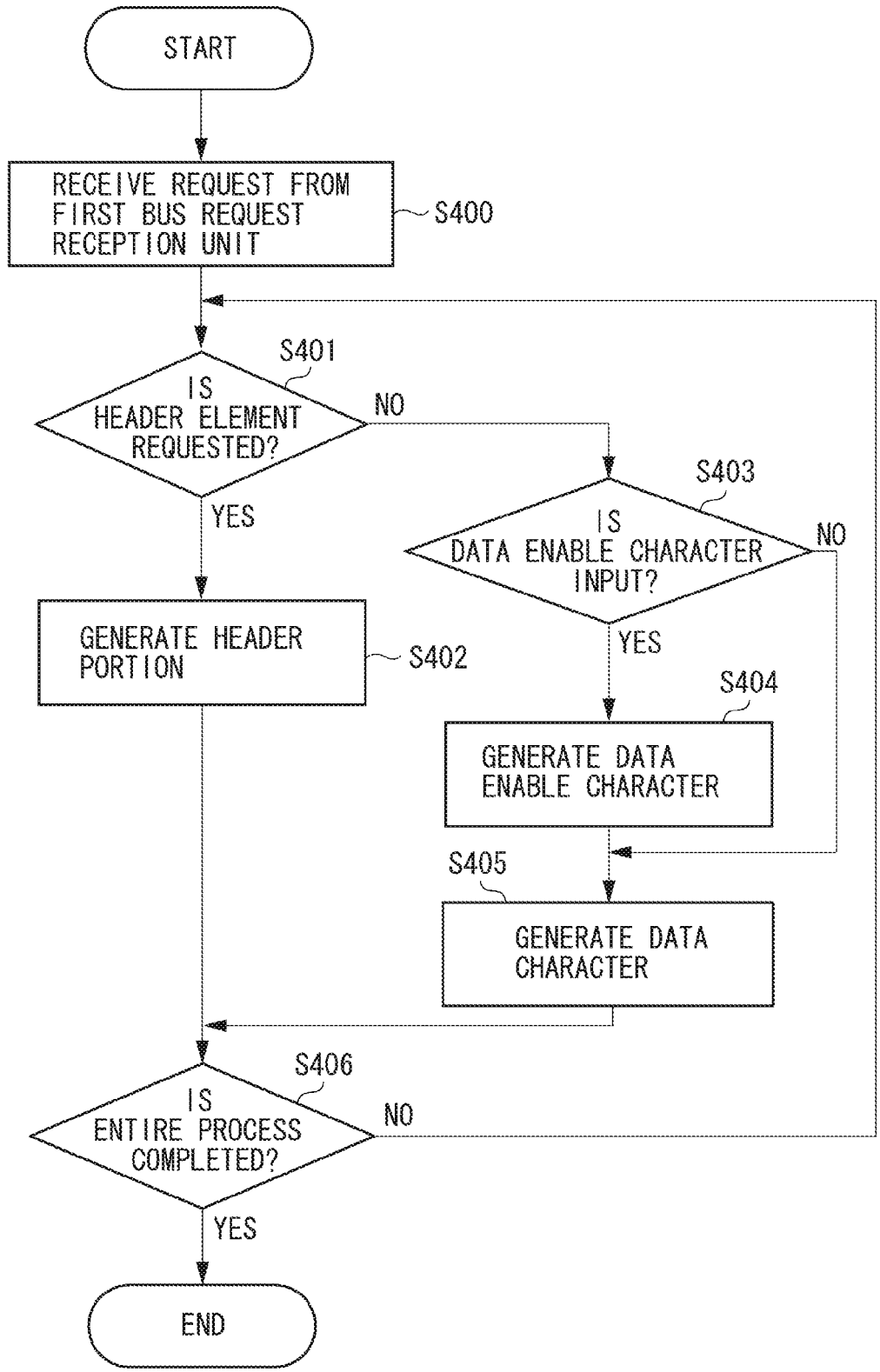
FIG. 4 illustrates a process flow performed by a character generation unit.

A character generation process performed by the character generation unit 1034 in the request packet transformation unit 1031 will be described in detail with reference to the flowchart in FIG. 4.

In step S400, the character generation unit 1034 in the request packet transformation unit 1031 starts the process when receiving a request transferred from the first bus request reception unit 1030. In step S401, the character generation unit 1034 determines whether the clamps of the request received at the timing constitute a header of the request. When the clumps constitute a header (YES in step S401), in step S402, the character generation unit 1034 generates the header portion illustrated in FIG. 3A. When the clumps do not constitute a header (NO in step S401), the character generation unit 1034 determines the clumps of the received request constitute a data portion, and advances the process to step S403. In step S403, the character generation unit 1034 determines whether to generate a character for write strobe, based on the determination result made by the data enable pattern recognition unit 1033.

FIG. 5 illustrates examples of write data (Wdata) in 32-bit unit and write strobes (Wstrb) in units of bytes generated by the data enable pattern recognition unit 1033 for requests from the bus masters in the present exemplary embodiment.

Each data enable character in the present exemplary embodiment has write strobe signals for two subsequent data characters.

The write strobe (Wstrb) corresponding to Wdata0 is "0111", and the write strobe (Wstrb) corresponding to Wdata1 is "1111". Accordingly, the write strobes (Wstrb) are not "true" in series in units of 64-bit data unit (8 bytes unit)

within the range from Wdata0 to Wdata 1. In step S404, the character generation unit 1034 receives the write strobe information from the data enable pattern recognition unit 1033, and generates a data enable character containing the write strobe information (Wstrb0) and a reservation area (Reserved). In the present exemplary embodiment, in step S405, the character generation unit 1034 generates the third character illustrated in FIG. 3A in response to the range from Wdata0 to Wdata1. After the generation of the data character for Wdata0 and Wdata 1 in step S405, the character generation unit 1034 generates the fourth and fifth characters illustrated in FIG. 3A. The reservation area is information used to align a next character, and the number of bits of the reservation area is determined according to the following: (the number of bits of one character)−(the number of bits of a character flag)−(the number of bits of a write strobe). In the present exemplary embodiment, it can be rewritten as 33−1−8=24, and thereby the reservation area is 24 bits long. With respect to the subsequent Wdata2 and Wdata3 also, the write strobes are not "true" in series in units of 8 bytes. Consequently, the process similar to that for Wdata0 and Wdata1 is repeated.

With respect to the subsequent Wdata4 and Wdata5, both of the write strobes are "1111", and are therefore "true" in series in units of 64-bit data (8 bytes) within the range from Wdata4 to Wdata 5. In step S404, the character generation unit 1034 receives the write strobe information from the data enable pattern recognition unit 1033, skips generation of a data enable character, and advances the process to step S405, where the character generation unit 1034 generates the ninth and tenth characters illustrated in FIG. 3A. In step S406, the above steps are repeated until a series of requests finishes and the process ends Through the above process, when the 8-byte data (i.e. data of the first number of bits) for Wdata0 contains invalid data, the request packet transmission unit 1032 transmits a write strobe Wtstrb in association with Wdata0, the Wtstrb indicating whether the data is valid for every 1 byte (i.e., the second number of bits).

In the case of a read request which does not have write data (Wdata) nor write strobe (Wstrb), only the address of a transfer destination (Address), a flag indicating whether the data is Write transfer or Read transfer, and the attribution information (ReqAtrb) about the transfer are processed. The process for a read request is similar to that for a write request except that the process for a read request does not include the steps for write data (Wdata) and write strobe (Wstrb) (i.e., steps S403, 404, and 405 in FIG. 4), and thereby is not described.

Figure 6:
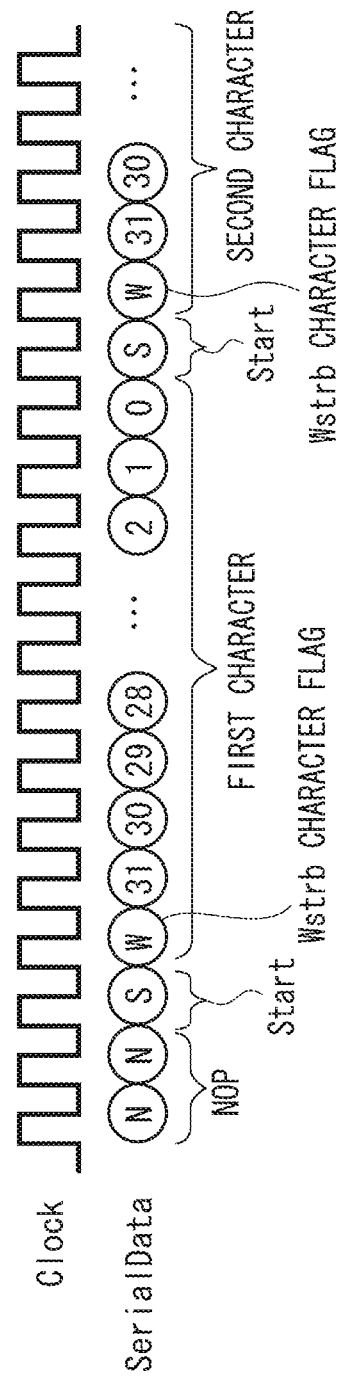
FIG. 6 illustrates an example of a data format used on a serial bus.

Each character transformed into a packet by the request packet transformation unit 1031 are transmitted to the receiver side ASIC_B 200 via the serial bus 300 from the request packet transmission unit 1032 at a clock timing. FIG. 6 illustrates a data format transferred in synchronization with a clock on the serial bus 300 in the present exemplary embodiment. In the format, a start bit as the head of the character is assigned to every character, and data indicating no operation (designated as NOP in FIG. 6) is transferred when there is no data to be transferred.

A request receiving process by the ASIC_B 200 will be described. The request packet reception unit 2030 detects the start bits in serial data transmitted from the ASIC_A 100 via the serial bus. The request packet reception unit 2030 then generates a 33-bit character from the 33-bit serial data following each start bit, and transfers the character to the request packet inverse transformation unit 2031.

An operation performed by the character determination unit 2033 in the request packet inverse transformation unit 2031 will be described with reference to the flowchart in FIG. 7. In step S700, the character determination unit 2033 extracts an identifier for transfer type (Type), transfer attribution information (ReqAtrb), and an address from each of two characters of the first transferred header portion, and transmits the information pieces to the second bus request transmission unit 2032. In step S701, the character determination unit 2033 determines whether characters of a data portion are following the head characters. When there are characters of a data portion (YES in step S701), in step S702, the character determination unit 2033 stores the number of data pieces (i.e., equivalent to the number of the data characters) obtained from transfer size information contained in the transfer attribution information (ReqAtrb). When there is no character of a data potion (NO in step S701), the character determination unit 2033 ends the process, and resumes it from step S700 for header processing when a next character is transferred. In step S703, when determining there are characters of a data portion, the character determination unit 2033 determines whether each of the characters is a data enable character or a data character, based on the data enable character flags of the following characters.

In step S704, when determining a character to be a data character, the character determination unit 2033 transfers the data clump (hereinafter element) to the second bus request transmission unit 2032, and notifies the data enable generation unit 2034 of the fact that the current character is a data character. In step S705, when the number of processed data pieces is less than the number stored in step S702 (YES in step S705), the process returns to step S703. In step S705, when the number of processed data pieces reaches the number stored in step S702 (NO in step S705), the process ends, and resumes from step S700 for header processing when a next character is transferred.

In step S703, when determining a character to be a data enable character, not a data character, (NO in step S703), in step S706, the character determination unit 2033 transfers the Wstrb element (first valid information) in the character as it is to the data enable generation unit 2034. The process then returns to step S703.

The data enable generation unit 2034 generates a write strobe Wstrb (second valid information) from the information received from the character determination unit 2033. In the present exemplary embodiment, the data enable generation unit 2034 generates a Wstrb element for every two-character data, that is, for every 64-bit data.

A Wstrb element generation method will be described.

The data enable generation unit 2034, when receiving a Wstrb element from the character determination unit 2033, transfers it as it is to the second bus request transmission unit 2032. When receiving notification that the character is a data character twice in a row (i.e., predetermined times in a row) without receipt of a Wstrb element from the character determination unit 2033, the data enable generation unit 2034 generates a Wstrb element indicating all "true" for data of two characters, and transmits the element to the second bus request transmission unit 2032.

The second bus request transmission unit 2032 transforms the element into a request format to the second bus 205, based on the transfer information from the request packet inverse transformation unit 2031, and transmits the request containing a write strobe obtained from the request packet inverse transformation unit 2031 to the DRAM controller B 204 via the second bus 205.

Next, a process to transmit a response received from the DRAM relative to the request from the bus master will be described. The second bus response reception unit 2035 receives a response from the DRAM controller B 204 via the second bus 205. The response contains status information (RespSt) indicating whether the transfer is error, Read data (Rdata), and transfer attribution information (RespAtrb) indicating transfer length or transfer priority.

The response packet transformation unit 2036 transform the response received from the second bus response reception unit 2035 into a packet. FIG. 3B illustrates a packet transformed from a request in the present exemplary embodiment. The packet contains a header and a data portion. Both of the header and data portion are divided into 32-bit elements, and a data enable character flag of 1 bit is attached to every element, resulting in a packet having a plurality of 33-bit characters. The header includes characters each containing an identifier (Type) for transfer type and a status (RespSt). The data portion includes characters each containing Read data (Rdata). The operation performed by the response packet transformation unit 2036 is similar to that by the request packet transformation unit 1031, except that the operation starts from step S401 in FIG. 4 upon reception of a response from the second bus response reception unit 2035, and that steps S403 and S404 in FIG. 4 are eliminated. Thus, the operation by the response packet transformation unit 2036 will not be described.

The response packet transmission unit 2037 performs parallel to serial conversion on the packet that is transformed from the response, and transmits the resultant packet to the serial bus 300. The operation for the parallel to serial conversion is similar to that performed by the request packet transmission unit 1032. After the parallel to serial conversion, the characters are transmitted to the ASIC_A 100 receiver at a clock timing via the serial bus 300.

Next, a response receiving process performed by the ASIC_A 100 will be described. The response packet reception unit 1035 detects a start bit in the serial data transmitted from the ASIC_B 200 via the serial bus 300, and transforms the 33-bit serial data following the start bit into a character, to transfer the character to the response packet inverse transformation unit 1036. The response packet inverse transformation unit 1036 performs processing for a header or a data portion according to type of the character. The operation performed by the response packet inverse transformation unit 1036 is similar to that by the request packet inverse transformation unit 2031 except elimination of the steps for Wstrb (i.e., steps S703 and S706 in FIG. 7). Accordingly, the operation by the response packet inverse transformation unit 1036 is not described.

The first bus response transmission unit 1037 transforms the information from the response packet inverse transformation unit 1036 into a response format to the first bus, and transmits the response via the first bus 105 to the first bus master that issued the request corresponding to the response.

As described above, according to the exemplary embodiment, data containing valid data information (e.g., write strobe) can be efficiently transferred.

As described in the above exemplary embodiment, the present invention is applicable to such data transfer between integrated circuits (chips), but is applicable to data transfer within an integrated circuit. In the above exemplary embodiment, data enable characters are generated in units of 64 bits, but may be generated in units of any number of bits. However, the number of bits of a character as the second number of bits needs to be less than the first number of bits of data corresponding to partially valid information.

A response does not contain valid data information in the above exemplary embodiment, but may contain valid data information as the request for the response does. In addition, in the above exemplary embodiment, an address and the other pieces are contained in a character as information to be transferred, but only data and valid data information may be contained in a character. The present invention is widely applicable to any technology to generate a packet from output data and output the packet.

The above exemplary embodiment does not describe in detail, but the data transferred by a data transfer apparatus is fed from a Central Processing Unit (CPU) and a peripheral devices such as Direct Memory Access Controller (DMAC), and external devices. A data transfer function can be started up by a CPU according to a predetermined program. The CPU may be incorporated in the ASIC_A or ASIC_B or disposed outside of the ASIC_A and ASIC_B in FIG. 1.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-106403 filed May 11, 2011, which is hereby incorporated by reference herein in its entirety.

What is claimed is:

1. A data transfer apparatus, comprising:
a reception unit configured to receive a signal including data and valid information indicating whether the data is valid in units of bytes; and
a transmission unit configured to transmit a piece of the valid information corresponding to a data portion of a first number of bits in the data received by the reception unit, an identifier indicating presence of the piece of the valid information, and the data portion of the first number of bits, in association with one another,
wherein the transmission unit is configured, when the data portion of the first number of bits in the data is valid, to skip transmission of the piece of the valid information corresponding to the data portion of the first number of bits.

2. A data transfer apparatus, comprising:
a packet reception unit configured to receive a packet;
a generation unit configured to generate second valid information based on first valid information contained in the packet; and
a transmission unit configured to transmit the second valid information generated by the generation unit and data contained in the packet,
wherein the generation unit is configured, when an identifier contained in the packet received by the reception unit indicates absence of the first valid information corresponding to a data portion of a first number of bits in the packet, to generate the second valid information indicating that the data portion of the first number of bits corresponding to the identifier is valid.

3. The data transfer apparatus according to claim 2, wherein, the generation unit is configured, when the identifier contained in the packet received by the reception unit indicates presence of the first valid information corresponding to the data portion of the first number of bits contained in the packet, to generate the second valid information based on the valid information.

4. A data transfer apparatus to transfer data in a packet each having a plurality of characters of a predetermined length, the apparatus comprising:
a reception unit configured to receive from a bus a signal containing data and valid information indicating whether the data is valid in units of bytes;

a generation unit configured to generate partially valid information corresponding to a data portion of a first number of bits in the valid information obtained from the bus, an enable character containing an identifier indicating presence of the partially valid information, and a data character containing the data portion of the first number of bits in the data received by the reception unit; and a transmission unit configured to transmit the packet containing a set of the enable character and the data character generated by the generation unit, wherein the generation unit is configured, when the valid information received from the bus has a predetermined pattern, to skip generation of the enable character.

5. A data transfer apparatus, comprising:
a reception unit configured to receive data;
a generation unit configured to generate valid information for every first number of bits with respect to the data; and
a transmission unit configured to transmit the valid information generated by the generation unit, an identifier indicating presence or absence of the valid information, and the data,
wherein the generation unit is configured, when every data portion of the first number of bits is valid in the data, to skip generation of the valid information corresponding to the data portions of the first number of bits.

6. The data transfer apparatus according to claim 4, wherein the generation unit generates the identifier indicating presence or absence of corresponding valid information for every second number of bits.

7. A data transfer apparatus, comprising:
a reception unit configured to receive a packet having a plurality of characters of a predetermined length;
a determination unit configured to determine whether the plurality of characters in the received packet respectively is a data character or an enable character;
a transformation unit configured, when the character determined by the determination unit is an enable character, to extract valid information of the data character from the enable character corresponding to the data character, and configured, when the characters determined by the determination unit are the predetermined number of serial data characters, to generate valid information indicating the data contained in a predetermined number of serial data characters is all valid; and
a transmission unit configured to transmit the valid information by the transformation unit and the data contained in the packet to a bus.

8. The data transfer apparatus according to claim 7, wherein the transformation unit is configured, when the determination unit determines a character is an enable character, to associate a data character of a first number of bits that is received by the reception unit subsequent to the enable character with partially valid information contained in the enable character.

9. A data transfer apparatus, comprising:
a reception unit configured to receive data and valid information indicating whether the data is valid for every second number of bits; and
a transmission unit configured to transmit the data received by the reception unit, in units of a first number of bits larger than the second number of bits,
wherein the transmission unit is configured, every time when a data portion of the first number of bits to be transmitted by the transmission unit contains invalid data, to transmit valid information corresponding to the data portion of the first number of bits and an identifier indicating presence of the valid information in association with the data portion of the first number of bits.

10. A data transfer method, comprising:
receiving a signal containing data and valid information indicating whether the data is valid in units of bytes; and
transmitting a packet containing a set of partially valid information that is a part of the valid information and corresponds to a data portion of a first number of bits, an identifier indicating presence of the set of partially valid information, and the data portion of the first number of bits,
wherein the transmitting is configured, when every data portion of the first number of bits in the data is valid, to skip the transmission of the set of partially valid information corresponding to the data portion of the first number of bits and the identifier indicating presence of the set of partially valid information.

11. A data transfer method, comprising:
receiving a packet;
generating second valid information based on first valid information contained in the packet; and
transmitting the generated second valid information and data contained in the packet,
wherein the generating is configured, when an identifier contained in the received packet indicates absence of the first partially valid information corresponding to a data portion of a first number of bits in the packet, to generate the second valid information indicating every data portion of the first number of bits corresponding to the identifiers is valid.

12. A method of transferring data in a packet having a plurality of characters of a predetermined length, the method comprising:
receiving from a bus a signal containing data and valid information indicating whether the data is valid in units of bytes;
generating an enable character containing partially valid information corresponding to a data portion of a first number of bits in the valid information received from the bus and an identifier indicating presence of the partially valid information, and a data character containing the data portion of the first number of bits in the received data; and
transmitting the packet containing a set of the generated enable character and data character,
wherein the generating is configured, when the valid information received from the bus has a predetermined pattern, to skip the generating of the enable character.

13. A data transfer method, comprising:
receiving data;
generating valid information for every first number of bits of the data; and
transmitting the generated valid information, an identifier indicating presence or absence of the valid information, and the data,
wherein the generating is configured, when every data of the first number of bits in the data is valid, to skip the generation of the valid information corresponding to the data portion of the first number of bits.

14. A data transfer method, comprising:
receiving data and valid information indicating whether the data is valid for every second number of bits; and
transmitting valid information corresponding to data portion of a first number of bits and an identifier indicating presence of the valid information in association with the data portion of the first number of bits, every time when the data portion of the first number of bits to be transferred contains invalid data while the received data is transmitted in units of the first number of bits larger than the second number of bits.

\* \* \* \* \*